Nov. 1, 1966   R. G. DOERFLING   3,282,624
VISOR CONSTRUCTION
Filed July 1, 1964   2 Sheets-Sheet 1
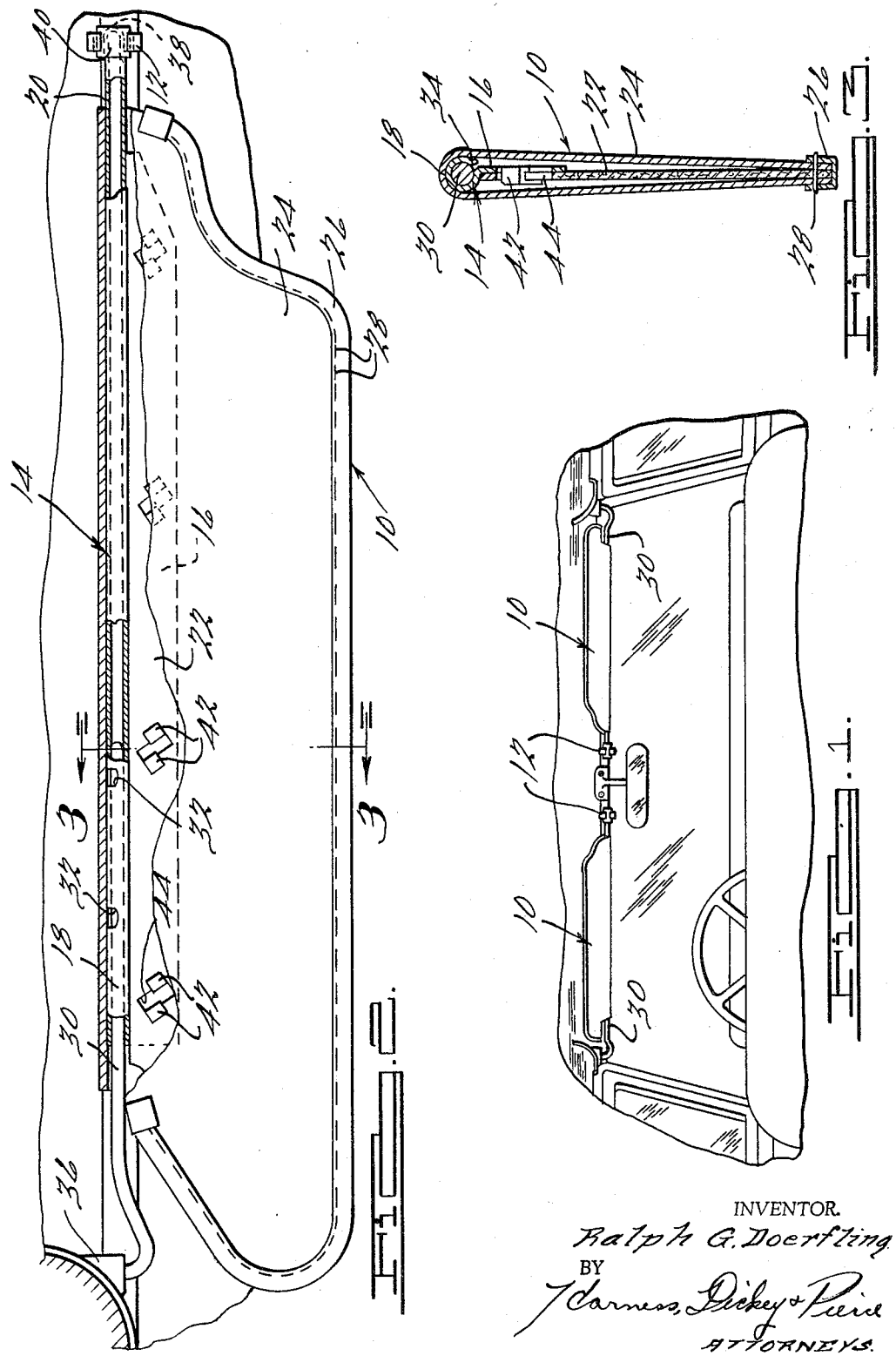
INVENTOR.
Ralph G. Doerfling
BY
Carness, Dickey & Pierce
ATTORNEYS.

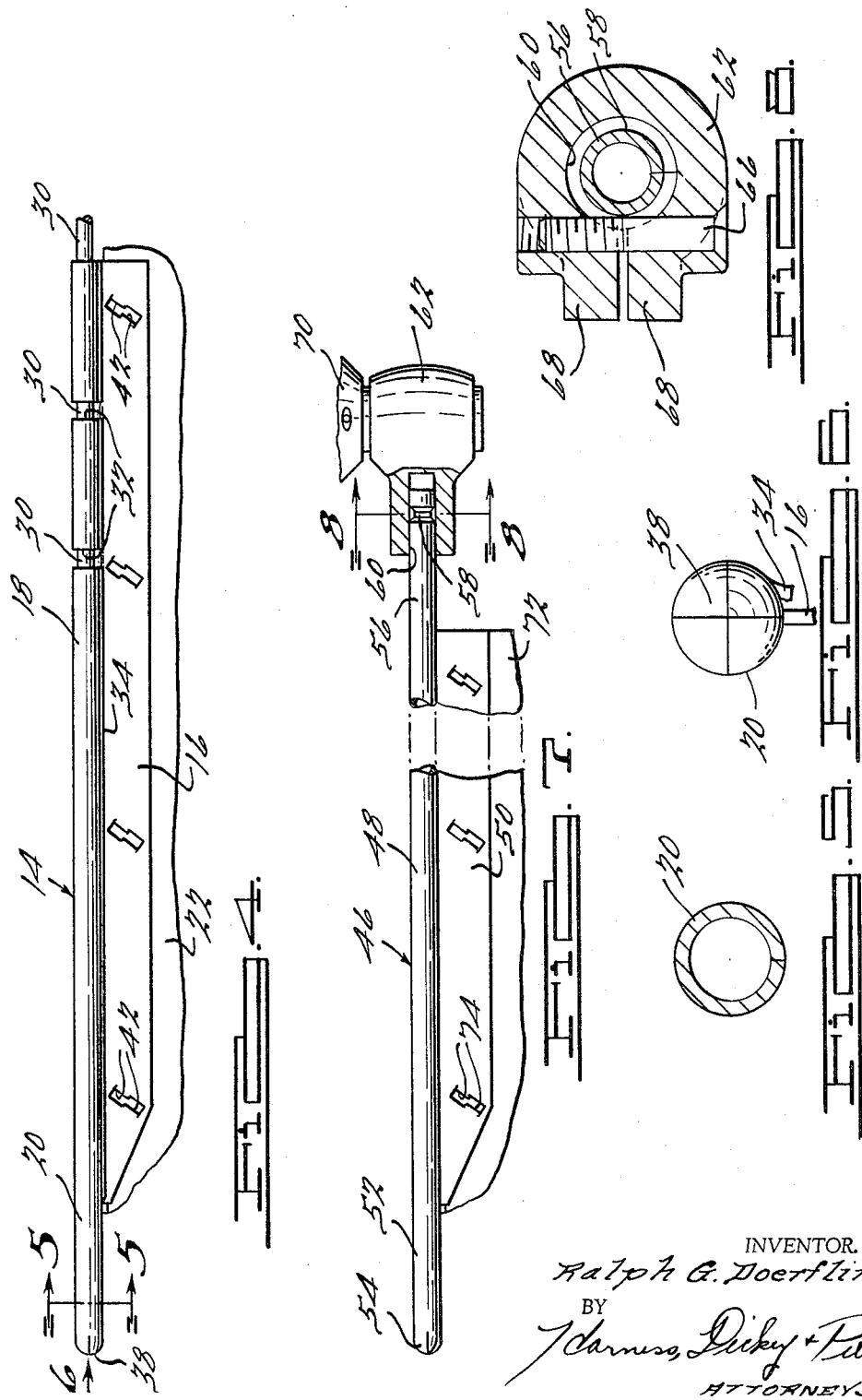

United States Patent Office 3,282,624
Patented Nov. 1, 1966

3,282,624
VISOR CONSTRUCTION
Ralph G. Doerfling, Walled Lake, Mich., assignor to Detroit Gasket and Manufacturing Company, New York, N.Y., a corporation of Delaware
Filed July 1, 1964, Ser. No. 379,582
3 Claims. (Cl. 296—97)

The present invention broadly relates to an improved integral hinge assembly and more particularly to a hinge assembly adaptable for use in pivotally supporting a sun visor or the like.

Various hinge arrangements have heretofore been used or proposed for use in the manufacture of sun visors or like members for use in various vehicles which enables relative pivoting and swinging movement of the visor to permit proper positioning thereof to minimize direct and reflected light from interfering with the vision of the operator. In sun visors of the conventional type employed in automobile interiors, it is necessary to provide hinge arrangements enabling circular swinging movement of the visor from a position adjacent to the windshield header to a position adjacent to the side window as well as relative pivoting movement of a visor panel from a raised position when not in use to a lowered position in which it is disposed in shading relationship relative to the driver's eyes.

In order to provide this compound movement of the visor, various relatively complex and costly hinge arrangements have heretofore been used or proposed for use which have been found unsatisfactory in some circumstances and in other instances impractical due to their relatively high cost and difficulty of fabrication. A continuing problem has also been presented by an inadvertent movement of the visor assembly from the stored position due to road shocks and jars which constitutes a nuisance to the driver as well as a potential hazard in obscuring his vision. To prevent inadvertent movement of the visor during periods of non-use, various supporting brackets have been provided for removably engaging the visor preventing inadvertent downward movement of the visor assembly. The provision of such retaining clips has caused a further increase in the complexity in the structure, an increase in the number of components, and a corresponding increase in the cost of the assembly.

It is, accordingly, a principal object of the present invention to provide an improved hinge assembly which is particularly applicable for use in a sun visor construction which incorporates an integral hinge member formed of a single metal strip which provides for increased simplicity in design, increased rigidity in construction, and an improvement in physical appearance.

Another object of the present invention is to provide an improved hinge assembly applicable for use in a sun visor which is of simple design, of durable operation, and of economical manufacture, assembly, and installation.

The foregoing and other objects and advantages of the present invention are achieved by providing a hinge assembly including a hinge member comprising an elongated flange integrally formed with an arcuate portion extending longitudinally along one edge thereof and which arcuate portion extends beyond at least one edge of the flange and is formed as a tubular section preferably having at least one end thereof formed with an arcuate end closure wall. In accordance with one embodiment of the present invention the arcuate portion is open at one end and is preferably provided with a series of longitudinally spaced circumferential slots in which a pin is positioned and is disposed in sliding frictional engagement therein enabling restrained relative pivoting movement of the hinge member and the pin. The opposite projecting end of the pin is suitably mounted in a bracket providing for horizontal pivoting movement of the hinge member about a vertical axis and a suitable U-shaped bracket affixed to the windshield header garnish molding is adapted to removably engage the other projecting end portion of the tubular section thereby restraining inadvertent movement thereof. A panel of a suitable configuration is securely fastened to the flange of said hinge member and the panel and hinge member are thereafter enclosed within a suitable decorative material which may additionally be padded to provide increased safety as well an enhancing its decorative appearance.

In accordance with an alternate embodiment of the present invention, the arcuate portion of the hinge member projects beyond both ends of the elongated flange and one end thereof is rotatably clamped within a suitable bracket providing for rotation of the flange about a substantially horizontal axis while the bracket itself is suitably supported for pivoting movement about an upright axis. The opposite end of the arcuate portion projecting beyond the other end edge of the flange is similarly formed as a tubular section, which is preferably closed at the end thereof with an arcuate end wall. This closed end similarly is adapted to be received by a suitable U-shaped clamp or bracket affixed to the windshield header to restrict inadvertent pivoting movement of the visor assembly.

Other objects, features and advantages of the present invention will become apparent from the subsequent description and the appended claims, taken in conjunction with the accompanying drawings, in which:

FIGURE 1 is a fragmentary perspective view illustrating a typical arrangement of a visor mounted adjacent to the windshield header of an automobile;

FIGURE 2 is an enlarged fragmentary plan view partly in section, of a visor constructed in accordance with one embodiment of the present invention;

FIGURE 3 is a transverse sectional view through the visor shown in FIGURE 2 and taken along the line 3—3 thereof;

FIGURE 4 is a fragmentary plan view of the opposite side of the hinge member from that viewed in FIGURE 2 with the visor covering material removed therefrom;

FIGURE 5 is a transverse sectional view through the projecting tubular section of the visor shown in FIGURE 4 and taken along the line 5—5 thereof;

FIGURE 6 is an end view of the hinge member shown in FIGURE 4 as viewed along the arrow indicated at 6;

FIGURE 7 is a fragmentary plan view of an alternate embodiment of a hinge assembly in accordance with the present invention illustrating alternate means for pivotally securing the hinge assembly to a bracket, and FIGURE 8 is a transverse sectional view of the bracket and tubular extension of the hinge assembly shown in FIGURE 7 and taken along the line 8—8 thereof.

Referring now in detail to the drawings and as may be best seen in FIGURE 1, a typical installation of a pair of visors 10 incorporating the improved hinge assemblies comprising the present invention is illustrated in mounted relationship adjacent to the windshield header of an automobile. Conventionally, the visors 10 are pivotally secured at a point adjacent to the upper ends of the windshield posts with the inner ends thereof removably clamped by a suitable U-shaped bracket indicated at 12 affixed along the center portion of the windshield header garnish molding. The visors 10 as illustrated, are in the inoperative stored position and may be positioned so that the panel portion thereof projects downwardly to intercept direct and reflected light and additionally may be angularly moved from the stored position adjacent to the windshield to a position adjacent to the side windows of the car as well as positions spaced therebetween.

The construction of the improved hinge assembly in accordance with one embodiment of the present invention will now be described in detail with particular reference to FIGURES 2–6. As shown in these figures, the visor 10 comprises a hinge member 14 consisting of an elongated flange 16 integrally formed with an arcuate portion indicated at 18 that extends for substantially the entire length of the flange 16 and projects beyond one end thereof in the form of a tubular section indicated at 20. A panel 22 is securely fastened to the flange 16 which is disposed in overlying relationship with one surface of the panel 22. The panel 22 may comprise any suitable material such as a composition hard board material, for example, which is of sufficient strength and rigidity to retain its shape and to support a suitable covering material indicated at 24 which overlies both surfaces of the panel 22 and extends around the arcuate portion 18. The covering material 24 is preferably secured along the edge of the panel 22 by means of a suitable overlying binding strip 26 which may suitably be adhered or sewn such as by stitches 28 along the contoured edge of the panel 22.

The assembled visor 10 is supported at a position adjacent to the header of a windshield by means of a pin 30 which extends into the open end of the arcuate portion 18 for a distance sufficient to provide adequate support of the assembly. The pin is disposed in sliding frictional relationship within the arcuate portion 18 enabling relative pivoting movement of the visor and the hinge member about the longitudinal axis of the pin. In order to facilitate a clamping relationship of the arcuate portion 18 about the periphery of the pin 30, it is preferred to provide a series of longitudinally spaced circumferential slots indicated at 32 about the arcuate portion disposed at suitable intervals along the length thereof corresponding to that section along which the pin 30 extends. In addition to providing pivoting movement of the hinge member and visor 10 about the longitudinal axis of the pin, the visor can also be moved longitudinally along the pin as may be desired to provide the requisite shading relationship.

In order to facilitate rotation of the hinge member and visor about the periphery of the pin 30, it is preferred that the edge of the arcuate portion 18 be formed with a radial outwardly extending lip 34 as best seen in FIGURES 3 and 6, to avoid any residual burr which may be present along the edge from engaging the periphery of the pin detracting from the pivotal movement of the visor relative to the pin. The pin 30 is suitably mounted at its outside end to a bracket indicated at 36 in FIGURE 2 providing for swinging movement of the pin and visor about a substantially vertical axis.

The tubular section 20 at the opposite end of the hinge member 14 is integrally formed with the arcuate portion and is preferably provided with an arcuate end closure wall 38 as may be best seen in FIGURES 2 and 6. The end closure wall 38 can readily be formed such as by swaging, for example, providing a solid appearance to the tubular section 20. A resilient collar 40, as shown in FIGURE 2, is preferably disposed in frictional engagement around the end of the tubular section 20, which is adapted to be engaged by the U-shaped bracket 12 mounted on the garnish molding at the header of the windshield. The resilient collar 40 provides for an improved frictional engagement with the U-shaped bracket 12 preventing inadvertent dislodgement of the visor from its normal position adjacent the windshield header.

The panel 22 may be affixed by any one of a variety of techniques to the elongated flange 16 of the hinge member 14. Preferably, attachment is achieved by forming a pair of diametrically disposed integral tabs indicated at 42 at selected intervals along the flange 16 which are adapted to be disposed in registration with a series of rectangular apertures 44 along one edge of the panel 22. On assembly, the panel 22 is simply placed in overlying relationship against one surface of the elongated flange 16 with the tabs 42 extending through the apertures 44 and thereafter the ends of the tabs are bent in overlying clamping relationship on the opposite surface of the panel 22 as illustrated in FIGURES 2 and 3, forming a unitary structure. This preferred method of securing the panel to the hinge member provides still a further advantage over techniques heretofore used such as stapling, for example, in that the fastening tabs 42 constitute an integral portion of the hinge assembly.

It will be apparent from the foregoing description that the hinge member 14 and the resultant visor incorporating the hinge member is of simple construction and assembly substantially reducing the cost of its manufacture and the number of components in the assembly. The hinge member itself is of a unitary construction and the projecting swaged tubular section 20 which may be formed of a bright metal such as stainless steel, for example or alternatively may be nickel or chrome plated, provides the appearance of a solid pin. The fact that the tubular section 20 is integrally formed with the arcuate portion 18 and flange 16 provides added strength to the hinge member as well as a reduction in its overall weight.

An alternative satisfactory modification of the hinge member as hereinbefore described, is illustrated in FIGURES 7 and 8. The alternative satisfactory hinge member indicated at 46 consists of an arcuate portion 48 having an elongated flange 50 integrally affixed to and extending radially from one edge thereof in the same manner as hereinbefore described in connection with FIGURES 1–6. A first tubular section 52 is integrally affixed to one end of the arcuate portion 48 and projects beyond the left edge as viewed in FIGURE 7 of the flange 50 in the same manner as the tubular section 20 of the hinge member 14 previously described. The first tubular section 52 is also preferably provided with an arcuate end closure wall 54 providing therewith the appearance of a solid pin construction. A suitable resilient collar may be positioned around the end portion of the first tubular section 52 for facilitating frictional engagement with a U-shaped bracket, such as the bracket 12 shown in FIGURE 1 for retaining the visor assembly in appropriate position adjacent to the windshield header.

The opposite end of the arcuate portion 48 is integrally formed with a second tubular section 56 which is positioned in longitudinal alignment therewith. The second tubular section 56 may be suitably formed with an annular groove 58 extending around the periphery thereof to facilitate retention of the second tubular section within a bore 60 in a pivotally mounted bracket 62. As is best seen in FIGURE 8, an adjusting screw 60 is provided in the bracket 62 which is positioned so that the inner periphery of the shank portion thereof intersects the edge of the bore 60 therethrough and is adapted to be disposed in engaging relationship with the groove 58, preventing thereby undesirable relative axial movement between the hinge member and the bracket 60. The hinge member, on assembly, is simply inserted in the bore 60, and thereafter the adjusting screw 66 is inserted so as to slidably engage the annular groove 58 and is fastened by threadably engaging a threaded bore in one of a pair of ears 68 projecting from the body of the bracket 62. The adjusting screw 66 is turned so as to provide the appropriate adjustment of the clamping relationship of the bracket 62 around the periphery of the end portion of the second tubular section 56 to prevent inadvertent relative pivoting movement of the visor during use. The bracket 62 itself is pivotally supported such as by means of a socket connection (not shown) to a mounting plate 70 which may be suitably affixed to the molding of the header of the windshield in a manner similar to the bracket 36 previously described in connection with FIGURE 2, enabling thereby appropriate swinging movement of the visor assembly from a position adjacent to the windshield header to a position angularly spaced therefrom.

A suitable panel 72 is affixed to the flange 50 of the hinge member 46 by means of tabs 74 in the same manner as hereinbefore described. The resultant hinge member and panel assembly is provided with a suitable covering material such as the covering material 24 illustrated in FIGURES 2 and 3 forming therewith a finished assembly.

It will be apparent from the foregoing description that both the hinge member 14 and the hinge member 46 can readily be fabricated from a flat sheet of material employing simple stamping, blanking, rolling and swaging dies and which operations are susceptible to automation forming therewith a unitary hinge member which is of substantially reduced cost and simple manufacture. In addition, the resultant hinge member is of high strength due to its integral construction and is of fixed size and configuration avoiding further assembly operations and adjustments as is required in visor constructions of similar type hereinbefore known.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A visor assembly comprising a hinge member including a flange, an arcuate portion integrally formed with and extending longitudinally along one edge of said flange for at least a portion of the length thereof, and a tubular section integrally affixed to at least one end of said arcuate portion and extending in longitudinal axial alignment relative to the longitudinal axis of said arcuate portion beyond one of the end edges of said flange, the projecting end of said tubular section integrally formed with an arcuate closure wall, a panel disposed in overlying relationship with one surface of said flange, means integrally formed with said flange for securing said flange to said panel, cover means positioned in overlying relationship over said panel and said flange and said arcuate portion of said hinge member, and means disposed in coacting engagement with said arcuate portion providing for restrained relative pivoting movement of said visor assembly about the longitudinal axis of said arcuate portion.

2. A visor assembly comprising a hinge member including a flange, an arcuate portion integrally formed with and extending longitudinally along one edge of said flange for at least a portion of the length thereof, a tubular section integrally affixed to one end of said arcuate portion and extending in longitudinal axial alignment relative to the longitudinal axis of said arcuate portion beyond one of the edges of said flange, the projecting end of said tubular section integrally formed with an arcuate end closure wall, a pin extending inwardly into the other end of said arcuate portion and disposed in sliding frictional engagement therein enabling restrained relative pivotal movement between said pin and said hinge member, a panel disposed in overlying relationship with one surface of said flange, means integrally formed with said flange for securing said flange to said panel, and cover means positioned in overlying relationship over said panel and said flange and arcuate portion of said hinge member.

3. A visor assembly comprising a hinge member including an elongated flange, an arcuate portion integrally formed with and extending longitudinally along one edge of said flange for the entire length thereof, a first tubular section integrally affixed to one end of said arcuate portion and extending in longitudinal axial alignment relative to the longitudinal axis of said arcuate portion beyond one of the end edges of said flange, the projecting end of said first tubular section integrally formed with an arcuate end closure wall, a second tubular section integrally affixed to the other end of said arcuate portion and extending in longitudinal axial alignment relative to said longitudinal axis beyond the other of the end edges of said flange, a panel disposed in overlying relationship with one surface of said flange, means integrally formed with said flange for securing said flange to said panel, cover means positioned in overlying relationship over said panel and said flange and arcuate portion of said hinge member, and engaging means on the end portion of said second tubular section providing for restrained relative pivoting movement of said hinge member.

References Cited by the Examiner

UNITED STATES PATENTS

| | | | |
|---|---|---|---|
| 2,201,348 | 5/1940 | Roberts | 296—97 |
| 2,328,360 | 8/1943 | Rigoulot | 296—97 |
| 2,628,861 | 2/1953 | Greig | 296—97 |
| 2,634,161 | 4/1953 | Beets | 296—97 |
| 3,035,864 | 5/1962 | Davidson | 296—97 |

FOREIGN PATENTS 1,125,997  7/1956  France.

BENJAMIN HERSH, *Primary Examiner.*

J. A. PEKAR, *Assistant Examiner.*